United States Patent
Sinnett (10) Patent No.: US 7,353,720 B2
(45) Date of Patent: Apr. 8, 2008

(54) BRIDGE PATCH FOR ELECTROMECHANICAL TRANSDUCER ELEMENTS IN TIRE ASSEMBLIES

(75) Inventor: Jay C. Sinnett, Greenville, SC (US)

(73) Assignee: Michelin Recherche et Technique, S.A., Granges-Paccot (CH)

( * ) Notice: Subject to any disclaimer, the term of this patent is extended or adjusted under 35 U.S.C. 154(b) by 0 days.

(21) Appl. No.: 10/887,945

(22) Filed: Jul. 9, 2004

(65) Prior Publication Data

US 2006/0006728 A1    Jan. 12, 2006

(51) Int. Cl.
*G01L 1/22*    (2006.01)
*B60C 23/00*    (2006.01)

(52) U.S. Cl. .................. 73/862.474; 340/442

(58) Field of Classification Search ........... 73/862.381, 73/862.391, 862.41, 862.473, 862.474, 146, 73/146.4, 146.5; 340/442, 445–448; 152/152.1, 152/539
See application file for complete search history.

(56) References Cited

U.S. PATENT DOCUMENTS

| | | | |
|---|---|---|---|
| 3,004,176 A * | 10/1961 | Mason et al. ................ | 310/333 |
| 5,181,975 A | 1/1993 | Pollack et al. | |
| 5,227,425 A | 7/1993 | Rauline | |
| 5,301,553 A * | 4/1994 | Schultz et al. ................ | 73/705 |
| 5,500,065 A | 3/1996 | Koch et al. | |
| 5,731,754 A | 3/1998 | Lee, Jr. et al. | |
| 5,877,679 A * | 3/1999 | Prottey ................ | 340/442 |
| 6,030,478 A | 2/2000 | Koch et al. | |
| 6,087,930 A | 7/2000 | Kulka et al. | |
| 6,147,659 A | 11/2000 | Takahashi et al. | |
| 6,192,746 B1 | 2/2001 | Wilson | |
| 6,244,116 B1 * | 6/2001 | Osmer et al. .......... | 73/862.474 |
| 6,255,940 B1 | 7/2001 | Phelan et al. | |
| 6,309,494 B1 | 10/2001 | Koch et al. | |
| 6,388,567 B1 | 5/2002 | Bohm et al. | |
| 6,462,650 B1 | 10/2002 | Balzer et al. | |
| 6,655,216 B1 * | 12/2003 | Aizawa ..................... | 73/715 |
| 6,705,365 B1 | 3/2004 | Wilson | |
| 6,810,753 B2 * | 11/2004 | Valdevit et al. ........ | 73/862.045 |
| 6,848,320 B2 * | 2/2005 | Miyajima et al. ............. | 73/763 |
| 2002/0124934 A1 | 9/2002 | Koch et al. | |
| 2003/0056579 A1 | 3/2003 | Poulbot et al. | |
| 2003/0217797 A1 | 11/2003 | Poulbot et al. | |
| 2003/0221766 A1 | 12/2003 | Strache et al. | |

(Continued)

FOREIGN PATENT DOCUMENTS

BR    0002146 A    10/2000

(Continued)

*Primary Examiner*—Jason R. Bellinger
(74) *Attorney, Agent, or Firm*—Dority & Manning, P.A.

(57) ABSTRACT

A bridge patch for use with a tire is provided. The bridge patch modifies the magnitude, orientation, or both of the mechanical forces, and particularly the stress-strain relationship, imparted by the inner liner of a tire in order to obtain the desired stress-strain relationship for operating an electromechanical transducer element attached to the bridge patch. The bridge patch includes at least one pad configured for attachment to the inner liner of the tire, and a bridge member attached to the pad and separated from contact with the tire. In certain embodiments, bridge patch includes a bridge member that is arch-shaped and is connected to two pads, one each located on the ends of the bridge member.

22 Claims, 5 Drawing Sheets

U.S. PATENT DOCUMENTS

2004/0094251 A1 5/2004 Strache et al.
2004/0155785 A1* 8/2004 Okubo et al. ............... 340/626

FOREIGN PATENT DOCUMENTS

| CA | 2305856 A1 | 10/2000 |
| DE | 19522269 A1 | 1/1997 |
| DE | 10255138 A1 | 6/2004 |
| EP | 0829382 A2 | 3/1998 |
| EP | 1048492 A2 | 11/2000 |
| JP | 200355202 A | 12/2000 |
| WO | WO 03/105511 A1 | 12/2003 |
| WO | WO 2005035278 A2 | 4/2005 |
| ZA | 200001879 A | 10/2000 |

* cited by examiner

BRIDGE PATCH FOR ELECTROMECHANICAL TRANSDUCER ELEMENTS IN TIRE ASSEMBLIES

TECHNICAL FIELD OF THE INVENTION

The present invention relates generally to a bridge patch attached to the inner liner of a tire that carries an electrical circuit with an electromechanical transducer element. The bridge patch is configured to impart mechanical forces to the electromechanical transducer element in a predetermined fashion when the tire experiences deformation.

BACKGROUND

The incorporation of electrical circuits into tire assemblies allows for a variety of functions including pressure monitoring, temperature monitoring, and the tracking of identification data and other information. An electromechanical transducer element, such as a piezo element, can be used to power the electrical circuit. The electromechanical transducer element converts forces imparted thereon into electrical power for use in running the electrical circuit.

One way of imparting forces to the electromechanical transducer element resides in utilizing tire deformation during vehicle operation. Deformation in the tire may produce, for example, a strain field of up to 50,000 microstrain that can be converted into electrical energy. However, subjecting the electromechanical transducer element to this amount of strain may cause the element to break if, for instance, the optimum peak strain of the element is 3000 microstrain. Furthermore, deformations within a tire during operation are generally non-uniform in amount and direction, creating difficulties in properly orienting a transducer element to efficiently harness energy from the deformations. Accordingly, a device that carries the electromechanical transducer element and imparts mechanical forces in a predetermined way (i.e. a desired stress-strain relationship) to the electromechanical transducer element when the tire experiences deformation would be useful.

SUMMARY

Various features and advantages of the invention will be set forth in part in the following description, or may be obvious from the description. The present invention provides a bridge patch for supporting electronics, including an electromechanical transducer element, within a tire. In general, one or more pads are configured for attachment to, or integration with, the inner liner of a tire and provide support to a bridge member that is attached to the pad but separated from the inner liner. Various parameters in the construction of the bridge member and pads may be altered to impart a particular and desired stress-strain relationship to the electromechanical transducer element during tire operation. As such, the amount and direction of forces applied to the electromechanical transducer element are controlled in a manner that protects the element from excessive force while applying the amount necessary to power associated electronics.

The bridge patch of the present invention can have a variety of configurations. For instance, the bridge member may be either substantially straight or arch-shaped. When arch-shaped, the bridge member may be arranged so that it is either concave or convex with respect to the inner liner of the tire. One or more supporting rails may also be located on the bridge member for increasing the stiffness of the bridge member if desired. To reduce stress concentrations, one or more ends of the bridge member may be cylindrical in shape in order to form a larger surface area at the point connection to the pad.

For example, in one exemplary embodiment, the present invention provides a tire assembly that includes a tire having an inner liner. A first pad and a second pad are attached to the inner liner of the tire and are separated from one another by a predetermined distance. A bridge member is provided that has at least two ends. On end is attached to the first pad, the another end attached to the second pad. The bridge member is separated from contact with the tire. An electromechanical transducer element is attached to the bridge member and is configured for converting mechanical energy from the tire into electrical energy. As such, the bridge member is configured with the first and second pads so as to control the mechanical energy imparted to the electromechanical transducer element as a result of the deformation of the inner liner during operation of the tire.

In another exemplary embodiment, the present invention provides a bridge patch assembly for use with a tire having an inner liner. The assembly includes at least one pad configured for placement upon the inner liner of the tire. A bridge member is attached to the pad and configured to be separated from contact with the tire when the pad is attached to the tire. An electromechanical transducer element is located upon the bridge member and is configured for converting mechanical energy from deformation of the tire into electrical energy. The pad may consist of a single pad to which the bridge member is attached. Alternatively, three pads may be provided, including a first pad, a second pad, and a third pad. As such, the second pad is located substantially between the first pad and the third pad. The bridge member is attached to the first pad and the second pad; at least one connecting element is attached to the second pad and the bridge member so as to further constrain the movement of the bridge member during use of the bridge patch with the tire.

Alternatively, where a single pad is used, the patch may be attached to the inner liner of a tire so that a chamber is formed having an interior space defined by the bridge member, the single pad, and the inner liner of the tire. The interior space may be fluidly sealed from the remaining interior space of the tire or, an aperture may be created to provide fluid communication with the interior space so defined. The bridge member may be arched, substantially flat, or other shapes may be used. When arch-shaped, the bridge member may arch towards or away from the inner liner of the tire. To help reduce stress concentrations, the bridge member may include rolled or cylindrically-shaped ends where connected to the pad. One or more rails may be included with the bridge member to increase its stiffness.

The present invention also provides a method for obtaining a desired stress-strain relationship on an electromechanical transducer element. In one exemplary embodiment, a method of the present invention includes providing a tire having a pair of pads located on the inner liner of the tire, bridging the pads with a bridge member such that the bridge member is separated from contact with the inner liner of the tire, and attaching an electromechanical transducer element to the bridge member. An additional step of sizing the thickness of the bridge member in order to provide the desired stress-strain relationship on the electromechanical transducer element during tire operation may be included. Similarly, this method may include a step of sizing the width of the bridge member in order to provide the desired stress-strain relationship on the electromechanical transducer element during tire operation. A step of spacing the bridge member from the inner liner of the tire in order to provide the desired stress-strain relationship on the electromechanical transducer element during tire operation may also be added. Finally, a step may be included for selecting a material for the bridge member such that the material has a modulus of elasticity that contributes to creating the desired stress-strain relationship on the electromechanical transducer element during tire operation.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

DETAILED DESCRIPTION OF PREFERRED EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

Figure 1:
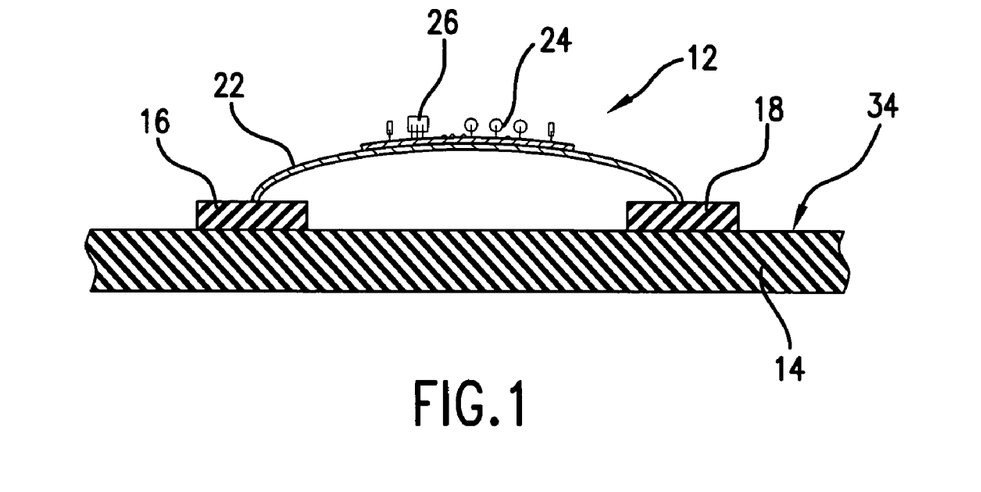
FIG. 1 is a cross-sectional view of an exemplary embodiment of a bridge patch taken along line 1-1 of FIG. 2.
Figure 2:
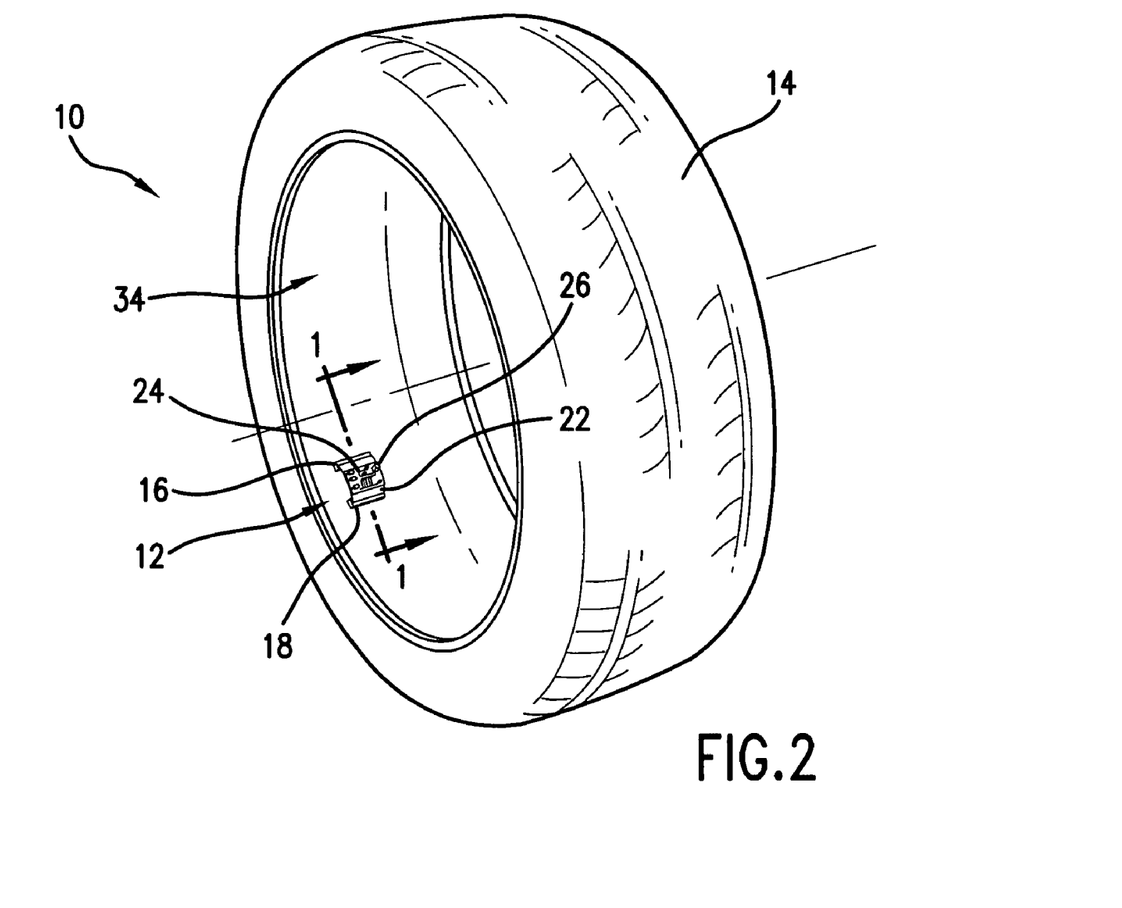
FIG. 2 is a perspective view of a tire assembly incorporating the exemplary embodiment of FIG. 1.

FIGS. 1 and 2 illustrate an exemplary embodiment of a bridge patch 12 of the present invention attached to inner liner 34 of a tire 14. FIG. 1 provides a cross-sectional view of patch 12 while FIG. 2 shows a tire assembly 10 with bridge patch 12 attached to the inner liner 34 of tire 14. Although shown attached opposite the crown of tire 14 with the length of the bridge member 22 oriented perpendicular to the axis of the tire 14, bridge patch 12 may be located at a variety of other positions and orientations with respect to tire 14.

Referring to FIG. 1, a pair of pads 16 and 18 are attached to the inner liner 34, and an arch-shaped bridge member 22 is attached on either end to pads 16 and 18. An electrical circuit 24 that includes an electromechanical transducer element 26, such as a piezo element, is attached to the bridge member 22. The bridge member 22 is thus suspended over and does not contact the inner liner 34. As previously discussed, to correctly function, the electromechanical transducer element 26 may require a different stress-strain relationship from that imparted to the inner liner 34 during operation of tire 14. The desired stress-strain relationship for transducer element 26 can be created through placement of transducer element 26 onto bridge patch 12. More specifically, bridge patch 12 and pads 16 and 18 can be configured to convert the stress-strain relationship imparted by deformation of the inner liner 34 into the desired stress-strain relationship for the electromechanical transducer element 26.

For example, as shown in the exemplary embodiment of FIG. 1, bridge member 22 is configured into an arch-shape between pads 16 and 18. This configuration can be used to reduce the magnitude of the stress-strain relationship the electromechanical transducer element 26 would otherwise experience if it were attached directly to inner liner 34. Additionally, the materials used in the construction of pads 16 and 18 can also allow for a reduction in the stress-strain experienced by transducer element 26 by operating to absorb or deflect part of the stress-strain that occurs during deformation of inner liner 34.

FIGS. 1 and 2 are provided by way of example of the present invention. As will be discussed, bridge patch 12 may also be used to redirect the stress-strain relationship in order to accommodate a desired orientation of the stress-strain relationship on the electromechanical transducer element 26. Further, the bridge patch 12 may be configured so that the magnitude and orientation of the stress-strain relationship is uniform across the entire bridge member 22. Alternatively, the bridge patch 12 may be configured so that the magnitude and orientation of the stress-strain relationship is different at various locations on the bridge member 22.

To so obtain the desired stress-strain relationship on the bridge member 22, various elements of the construction of the bridge patch 12 can be altered to provide the desired result. For instance, the width, thickness, shape and/or modulus of elasticity of the bridge member 22 or pads 16 and 18 may be varied to obtain the desired stress-strain relationship for the electromechanical transducer element 26. Additionally, the distance separating the inner liner 34 from the bridge member 22 may also be varied in order to help obtain the desired stress-strain relationship. Thus, using the teachings disclosed herein, one of ordinary skill in the art will understand that various parameters may be adjusted in order to transform the stress-strain relationship of the inner liner 34 into the desired stress-strain for bridge patch 12. Various exemplary embodiments of the bridge patch 12 will now be discussed in greater detail.

Figure 4:
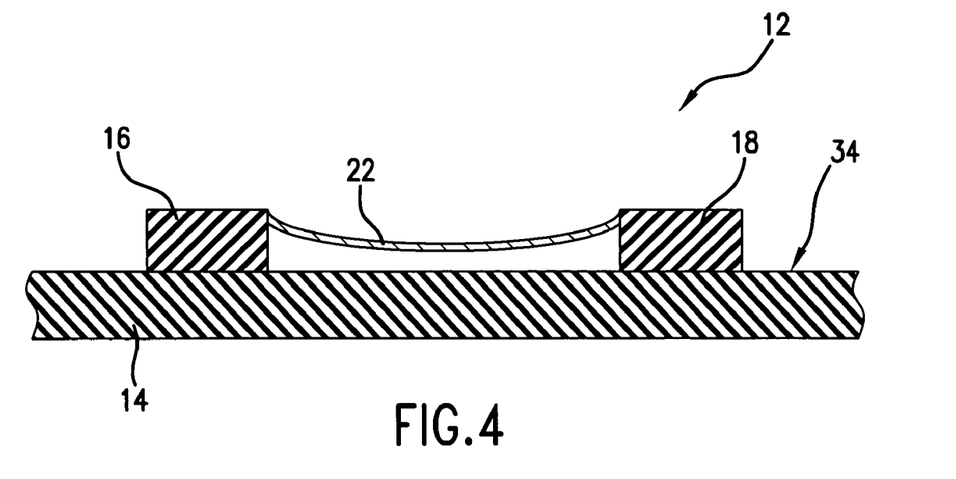
FIG. 4 is a cross-sectional view of another exemplary embodiment of a bridge patch arching towards the tire surface.

For example, referring now to FIG. 4, bridge patch 12 may be alternatively configured so that bridge member 22 is arched in and towards inner liner 34. The electromechanical transducer element 26 may be attached to either side of the bridge member 22 depending upon the stress-strain relationship desired during operation of tire 14.

Figure 5:
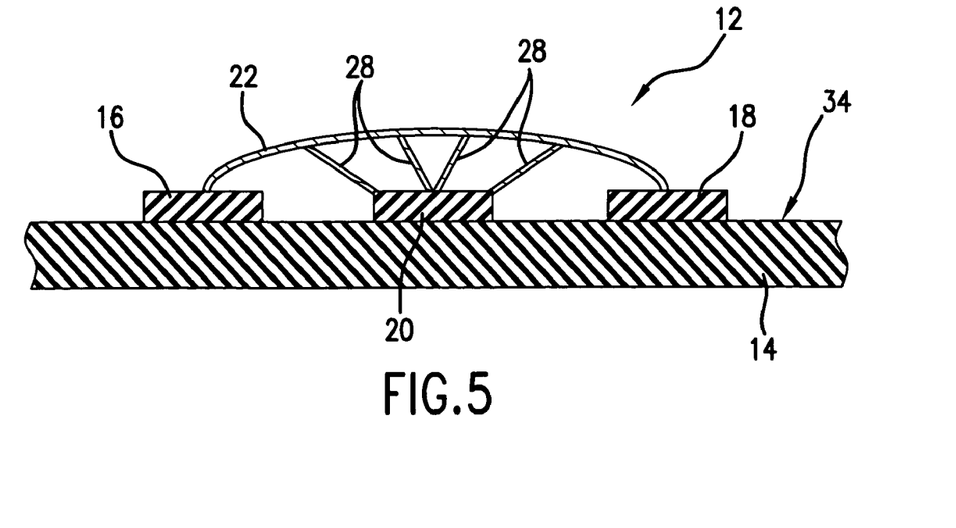
FIG. 5 is a cross-sectional view of an exemplary embodiment of a bridge patch having a plurality of connecting elements and a third pad.

Alternatively, bridge patch 12 may be configured as shown in FIG. 5. Here, an additional pad 20 is attached to the inner liner 34 and is located between pads 16 and 18. One or more connecting elements 28 may be attached to both pad 20 and bridge member 22. The connecting elements 28 stiffen the bridge member 22 and help obtain the desired stress-strain relationship.

Figure 6:
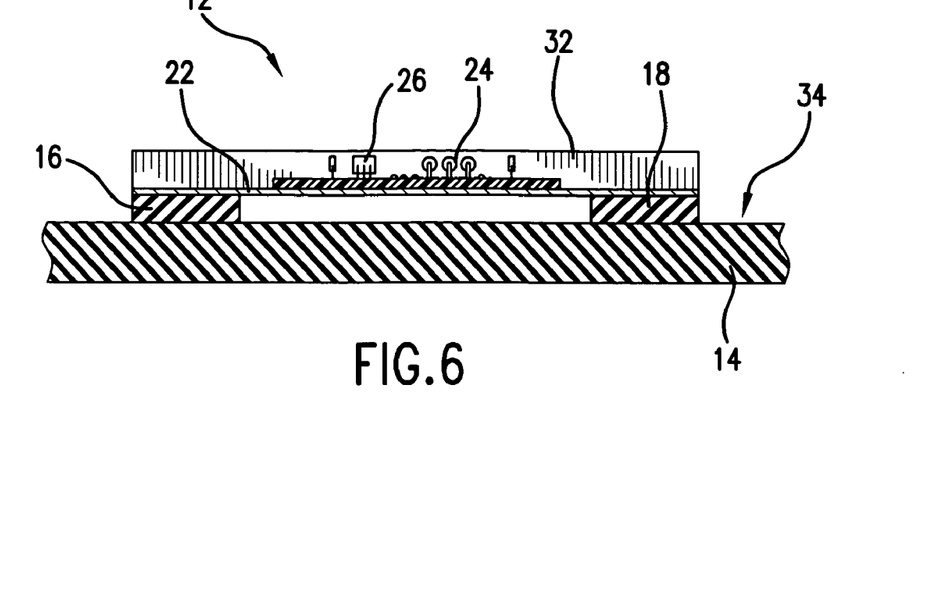
FIG. 6 is a cross-sectional view taken along line of 6-6 of FIG. 7.
Figure 7:
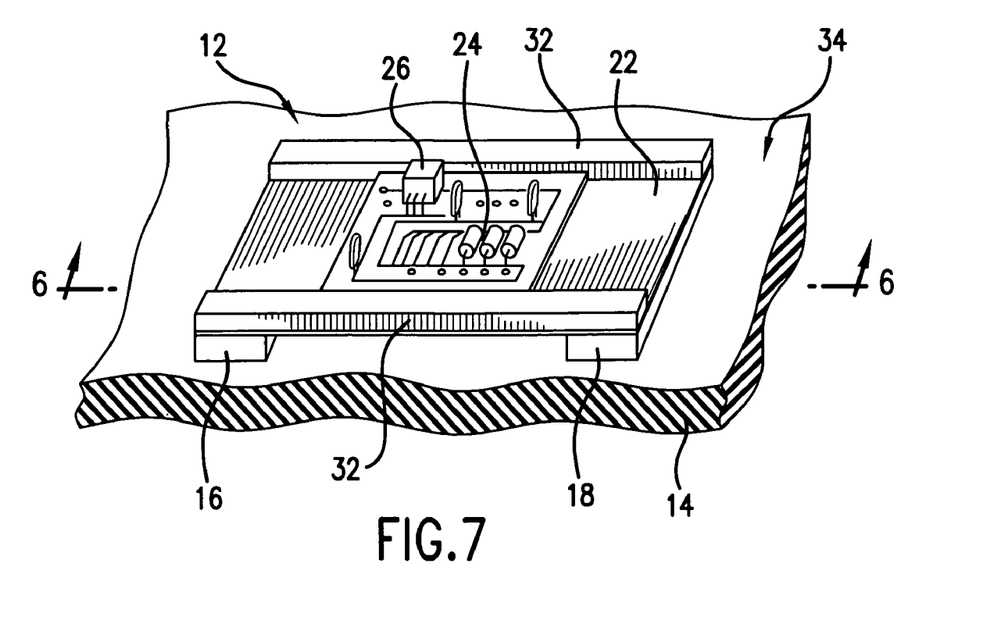
FIG. 7 is a perspective view of an exemplary embodiment of a bridge patch without an arch shape.

Although previously described as arch-shaped, bridge member 22 may also be configured to be substantially straight, as shown in FIGS. 6 and 7. Bridge member 22 may be provided with one or more supporting rails 32 in order to help stiffen bridge member 22 and subsequently produce the desired stress-strain relationship. Supporting rails 32 may be provided in any number, thickness, cross-sectional shape, or size in order to achieve a desired stiffness of bridge member 22.

Figure 8:
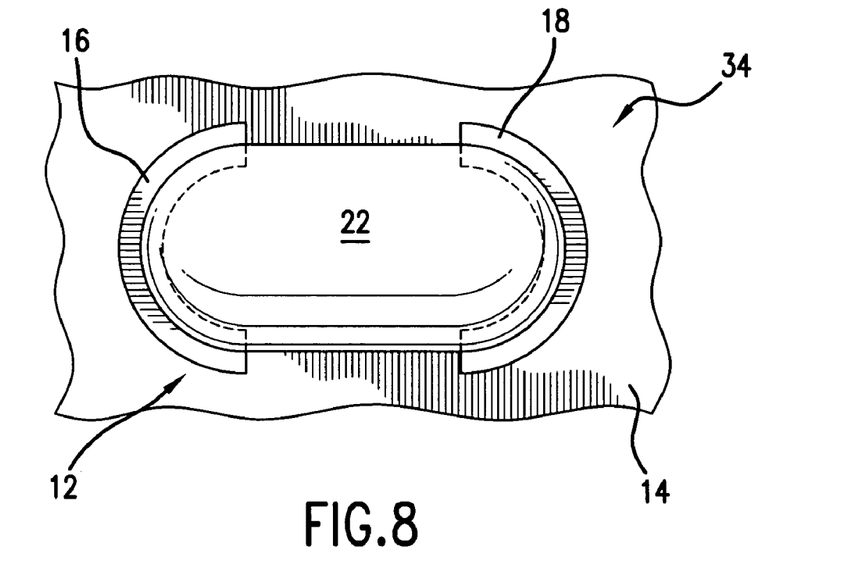
FIG. 8 is a plan view of an exemplary embodiment of a bridge patch with arch-shaped pads.

In this exemplary embodiment, as is true with all exemplary embodiments of the present invention, pads 16 and 18 may be configured in order to help obtain the desired stress-strain relationship. For instance, the thickness, shape, or materials of construction selected for pads 16 and 18 can be varied in order to help obtain the desired stress-strain relationship on bridge member 22. FIG. 8, for example, shows a configuration where the pads 16 and 18 are arch-shaped, instead of being simply rectangular as shown in other exemplary embodiments.

Figure 9:
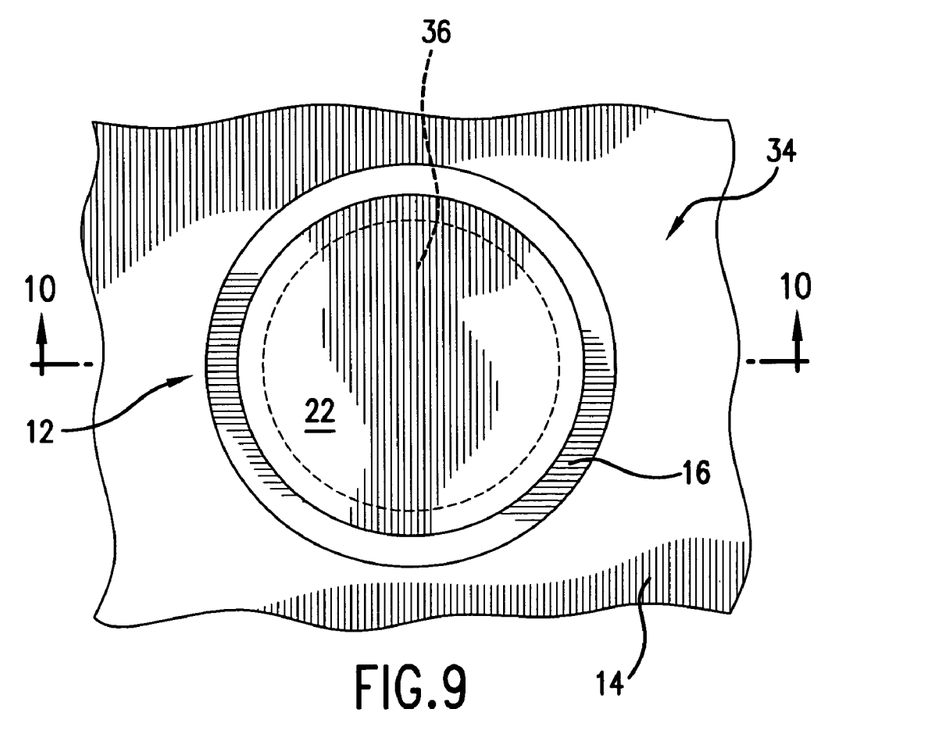
FIG. 9 is a plan view of an exemplary embodiment of a bridge patch with a single pad.
Figure 10:
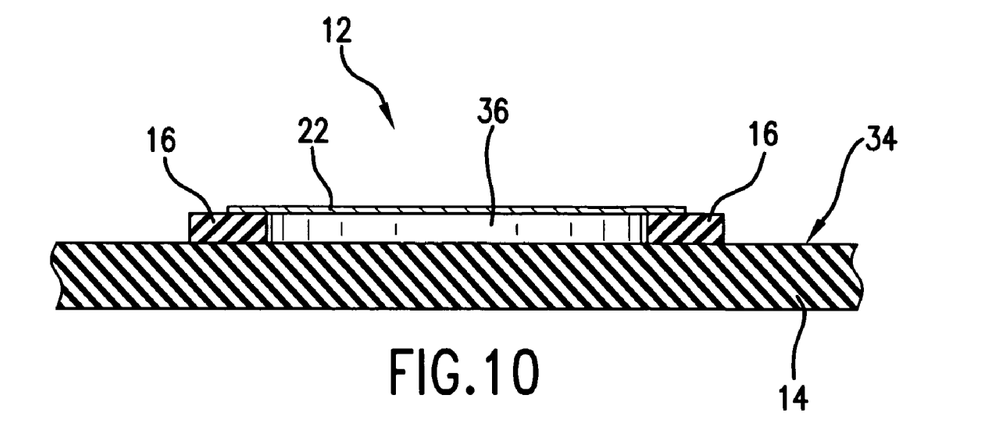
FIG. 10 is a cross-sectional view taken along line 10-10 of FIG. 9.
Figure 11:
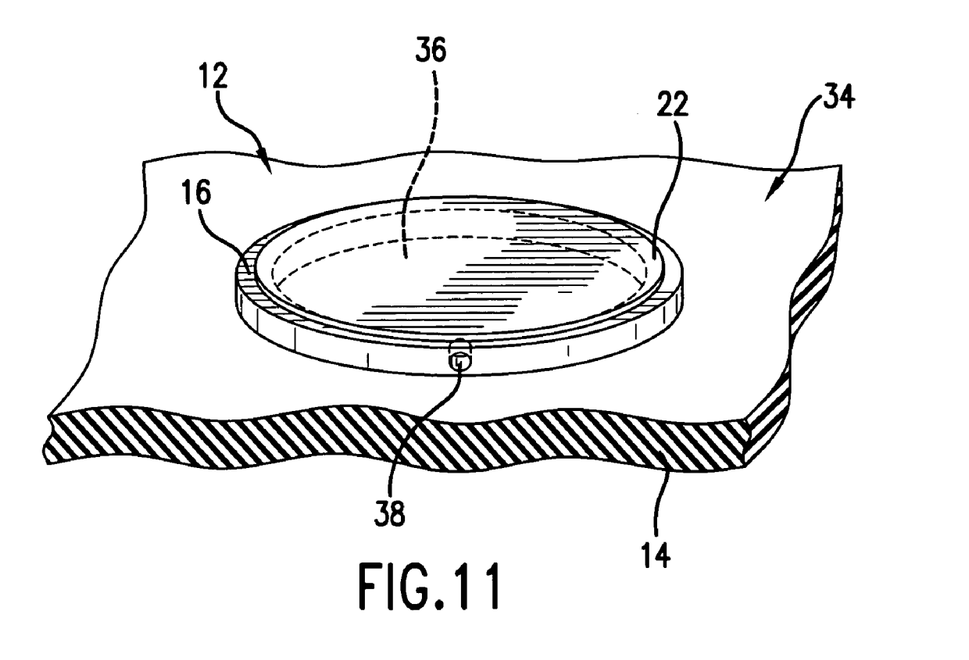
FIG. 11 is a perspective view of an exemplary embodiment of a bridge patch with a single pad having a passageway defined therethrough.

Although described as incorporating a plurality of pads 16 and 18, bridge patch 12 can be configured so that only a single pad 16 is present. FIG. 9 shows one such exemplary embodiment where the perimeter of bridge member 22 is attached to a single pad 16. This arrangement of bridge patch 12 causes tire 14, pad 16, and bridge member 22 to define an interior space 36 as shown in FIG. 10. Interior space 36 may be fluidly sealed from the rest of the air in tire 14 when tire 14 is mounted onto a wheel. The difference in air pressure between interior space 36 and the rest of the air in tire 14 could be used to help impart a desired stress-strain relationship on bridge member 22 that is subsequently transferred to the electromechanical transducer element 26. Alternatively, as shown in FIG. 11, an aperture 38 may be defined through pad 16 in order to equalize the air pressure between interior space 36 and the rest of the air in tire 14.

The construction of pads 16 and 18, shown throughout the exemplary embodiments in the figures provided herein, can be provided as separate parts that are attached to the inner liner 34. Alternatively, pads 16 and 18 may be molded onto the inner liner 34 during the building process of the tire 14. Pads 16 and 18, along with bridge member 22, may be made of a variety of different materials. For example, pads 16 and 18 may be made of rubber while bridge member 22 may be made of steel, polymers, fiberglass, or a composite structure. Preferably, bridge member 22 is made of a material that is capable of experiencing repeated deformations without fatigue failure. Pads 16, 18 may be anchored to inner liner 34 in such a manner so as to pre-stress electromechanical transducer element 26 in either compression or tension should such a condition benefit the performance of electromechanical transducer element 26.

Electrical circuit 24, which includes electromechanical transducer element 26, can be attached to bridge member 22 in any manner commonly known in the art. By way of example only, an adhesive may be used to attach electrical circuit 24. Electromechanical transducer element 26 may be incorporated into the electrical circuit 24, or may alternatively be attached to bridge member 22 separate from electrical circuit 24. Although shown in FIG. 1 as being attached to the side of bridge member 22 that is opposite inner liner 34, it should be understood that electromechanical transducer element 26 may be attached to either side of bridge member 22.

Figure 3:
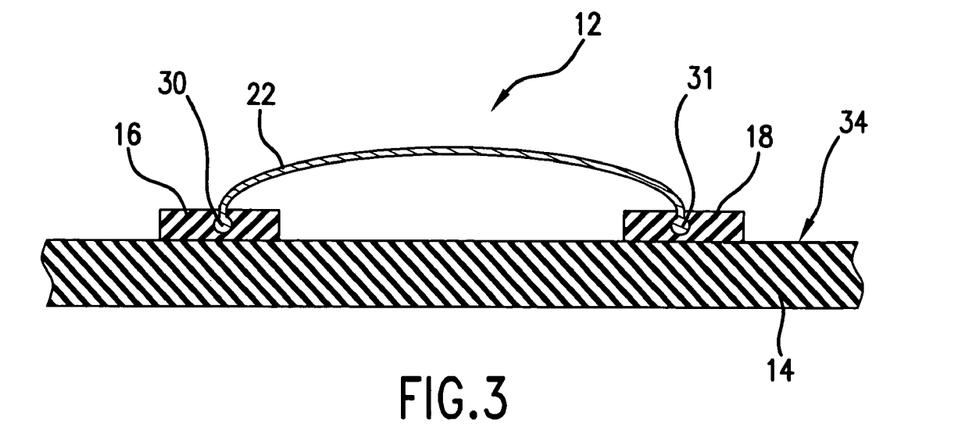
FIG. 3 is a cross-sectional view of an exemplary embodiment of a bridge patch with a pair of cylindrically-shaped ends.

Additionally, bridge patch 12 may be designed so as to reduce or eliminate a possible stress concentration located at the point of attachment between the bridge member 22 and pads 16 and 18. FIG. 3 shows bridge member 22 with a pair of cylindrically shaped ends 30 and 31 that are attached to pads 16 and 18. The enlarged surface area of cylindrically-shaped ends 30 and 31 helps to distribute stress located at the point of attachment between bridge member 22 and pads 16 and 18 so that a stress concentration at this location is either reduced or eliminated. Cylindrically shaped ends 30 and 31 may be formed into bridge member 22 in a variety of manners. For instance, if bridge member 22 is made of a metal, the ends may be simply rolled into a cylindrical shape in order to form cylindrically-shaped ends 30 and 31. If bridge member 22 is made of a stiff polymer, bridge member 22 may be molded with cylinders on each end or alternatively, could have cylinders adhered onto each end in order to form the cylindrically shaped ends 30, 31. As necessary, this stress-reducing feature may be used with any of the exemplary embodiments described herein.

It should be understood that the present invention includes various modifications that can be made to the exemplary embodiments of the tire assembly 10 and bridge patch 12 as described herein that come within the scope of the appended claims and their equivalents.

What is claimed is:

1. A tire assembly, comprising:
   a tire having an inner liner;
   a first pad and a second pad attached to said inner liner of said tire and separated from one another by a predetermined distance;
   a bridge member having at least two ends, wherein at least one of said ends is attached to said first pad and the other end is attached to said second pad, said bridge member comprising a continuous element spanning between said first pad and said second pad, said bridge member separated from contact with said tire and mechanically isolated from the tire except through attachment to said first and second pads; and
   an electromechanical transducer element attached to said bridge member and configured for converting mechanical energy from said tire into electrical energy, wherein said bridge member is configured with said first and second pads so as to control the mechanical energy imparted to said electromechanical transducer element as a result of the deformation of said inner liner during operation of said tire.

2. The tire assembly of claim 1, wherein said continuous element is of substantially uniform cross-section.

3. The tire assembly of claim 1, wherein said continuous element is constructed from a single substrate of material.

4. The tire assembly as set forth in claim 1, wherein said at least two ends of said bridge member are substantially cylindrical in shape in order to reduce stress concentrations during operation of said tire.

5. The tire assembly as set forth in claim 1, further comprising an electrical circuit located upon said bridge member and electrically connected to said electromechanical transducer element.

6. The tire assembly as set forth in claim 5, wherein said electrical circuit and said electromechanical transducer are located between said bridge member and said inner liner.

7. The tire assembly as set forth in claim 1, wherein said first pad and said second pad are arch-shaped.

8. The tire assembly as set forth in claim 1, wherein said bridge member includes at least one support rail located thereon for increasing the stiffness of said bridge member.

9. The tire assembly as set forth in claim 1, wherein said bridge member is arched towards said inner liner of said tire between said first pad and said second pad.

10. The tire assembly as set forth in claim 1, wherein said bridge member is arched away from said inner liner of said tire between said first pad and said second pad.

11. A method of obtaining a desired stress-strain relationship on an electromechanical transducer element, comprising the steps of:
 providing a tire having an inner liner;
 placing at least a pair of pads at a predetermined distance apart from each other upon the inner liner of the tire;
 spanning the predetermined distance with a bridge element that is continuous between the pads, separated from contact with the inner liner of the tire, and mechanically isolated from the tire except through contact with the pads; and
 providing an electromechanical transducer element attached to the bridge element.

12. The method as set forth in claim 11, further comprising the step of sizing the thickness of the bridge member in order to provide the desired stress-strain relationship on the electromechanical transducer element during tire operation.

13. The method as set forth in claim 11, further comprising the step of sizing the width of the bridge member in order to provide the desired stress-strain relationship on the electromechanical transducer element during tire operation.

14. The method as set forth in claim 11, further comprising the step of spacing the bridge member from the inner liner of the tire in order to provide the desired stress-strain relationship on the electromechanical transducer element during tire operation.

15. The method as set forth in claim 11, further comprising the step of selecting a material for said bridge member such that said material has a modulus of elasticity that contributes to providing the desired stress-strain relationship on the electromechanical transducer element during tire operation.

16. An assembly for attaching electronics to a tire, the tire having an inner-surface, the assembly comprising:
 a base element for attaching to the inner-surface of the tire, and
 a bridge member comprising a first end, a second end, and a continuous element connecting said first end and said second end, wherein said first end and said second end are attached to said base element, and wherein said bridge member is shaped so that no physical contact is made between said continuous element and the inner-surface of the tire except at said first and said second end; and
 an electromechanical transducer element attached to said bridge member and configured for converting mechanical energy from the tire into electrical energy, wherein said bridge member is configured upon said base element so as to control the mechanical energy imparted to said electromechanical transducer element as a result of the deformation of the inner surface during operation of the tire.

17. The assembly for attaching electronics to a tire as set forth in claim 16, wherein said continuous element is of substantially uniform cross-section.

18. The assembly for attaching electronics to a tire as set forth in claim 16, wherein said continuous element is constructed from a single substrate of material.

19. The assembly for attaching electronics to a tire as set forth in claim 16, wherein said first end and said second end of said bridge member are substantially cylindrical in shape in order to reduce stress concentrations during operation of the tire.

20. The assembly for attaching electronics to a tire as set forth in claim 16, further comprising an electrical circuit located upon said bridge member and electrically connected to said electromechanical transducer element.

21. The assembly for attaching electronics to a tire as set forth in claim 16, wherein said bridge member is arched towards the inner surface of the tire between said first end and said second end.

22. The assembly for attaching electronics to a tire as set forth in claim 16, wherein said bridge member is arched away from the inner liner of the tire between said first end and said second end.

* * * * *